United States Patent [19]

Gradl et al.

[11] Patent Number: 4,540,557

[45] Date of Patent: Sep. 10, 1985

[54] PROCESS FOR REDUCING THE FLUORINE CONTENT IN WET-PROCESSED PHOSPHORIC ACID

[75] Inventors: Reinhard Gradl, Hürth; Günther Schimmel, Erftstadt, both of Fed. Rep. of Germany

[73] Assignee: Hoechst Aktiengesellschaft, Fed. Rep. of Germany

[21] Appl. No.: 633,142

[22] Filed: Jul. 23, 1984

[30] Foreign Application Priority Data

Aug. 6, 1983 [DE] Fed. Rep. of Germany ....... 3328499

[51] Int. Cl.³ .................... C01B 25/16; C01B 15/16; C01B 25/26
[52] U.S. Cl. ................ 423/321 R; 423/309; 423/313; 423/321 S
[58] Field of Search ............ 423/321 R, 321 S, 309, 423/313

[56] References Cited

U.S. PATENT DOCUMENTS 4,065,547 12/1977 Leroy et al. .................... 423/321 R

FOREIGN PATENT DOCUMENTS 2229602 9/1973 Fed. Rep. of Germany .
2535971 10/1978 Fed. Rep. of Germany .

*Primary Examiner*—Gregory A. Heller
*Attorney, Agent, or Firm*—Connolly and Hutz

[57] ABSTRACT

The disclosure relates to a process for reducing the fluorine content in wet-processed phosphoric acid. To this end, the disclosure provides for an acid extract in an organic solvent to be treated with an at least 45 weight % suspension of aluminum hydroxide of which 99% consist of particles with a size of less than 1 μm, the balance consisting of particles with a size of less than 10 μm.

6 Claims, No Drawings

PROCESS FOR REDUCING THE FLUORINE CONTENT IN WET-PROCESSED PHOSPHORIC ACID

The present invention relates to a process for reducing the fluorine content in wet-processed phosphoric acid, wherein the crude acid containing fluorine ions is extracted with an organic solvent, the resulting organic phosphoric acid extract is washed with an aqueous aluminium hydroxide suspension and purified phosphoric acid or an alkali metal phosphate solution is recovered from the washed extract by re-extraction with water.

It is generally known that wet-processed phosphoric acid can be purified with the use of organic solvents partially or completely miscible or immiscible with water. The removal or partial removal of fluoride ions from crude phosphoric acid during the extraction step and from purified final product has also been described repeatedly in literature.

German Specification DE-AS No. 2 229 602, for example, describes a process for purifying commercial phosphoric acid by extracting it with an organic solvent of unlimited miscibility with water, wherein a solution of phosphoric acid and the solvent is extracted by means of a concentrated aqueous solution of an inorganic salt. The salt solution is more especially selected from an acid phosphate of a polyvalent cation, inter alia of aluminum. An adverse effect associated with this process resides in the fact that it is necessary for the organic phase to be treated with a strongly acid cation exchanger so as to be freed from cations originating from the salt phase.

As taught in German Specification DE-AS No. 25 35 971, wet-processed phosphoric acid can be freed from fluoride ions by extracting the crude acid containing about 25% $P_2O_5$ with an organic solvent scarcely miscible with water, and washing the organic phosphoric acid phase with an aqueous or phosphoric acid solution, e.g. of an aluminum compound. This solution is normally obtained by reacting $Al(OH)_3$ with concentrated phosphoric acid which is taken from the final product and contains about 0.5 to 2.5% aluminum ions. Adverse effects reside in that it is invariably necessary to use very dilute phosphoric acid extracts and in that the low solubility of the aluminum phosphate makes it necessary for the system to be admixed with large quantities of washing liquid, based on the phosphoric acid dissolved in the organic phase, so that very dilute acid is finally obtained. In addition to this, a good deal of already purified phosphoric acid has to be recycled for use in preparing the aluminum phosphate solution. Needless to say, the total yield is naturally impaired. Apart from this, the aluminum phosphate solution must be prepared in an additional processing step necessitating the supply and abstraction of heat and careful control of the reaction.

Commercially available aluminum hydroxide should conveniently not be used as this compound is practically insoluble in water and dissolves very reluctantly in phosphoric acid so that solid material is liable to deposit on the extraction means and give rise to disturbances during operation (cf. Example 6 hereinafter).

It is therefore desirable to have a process permitting the fluorine content of a wet-processed phosphoric acid solution containing at least 10 weight % $P_2O_5$ in an organic solvent to be reduced; the organic solvent should preferably be immiscible or difficultly miscible with water. In the present process the phosphoric acid solution is diluted with fairly small quantities of water and remains free from foreign ion contaminants.

To this end, the present invention unexpectedly provides for the organic solution of wet-processed phosphoric acid to be washed with an aqueous aluminum hydroxide suspension containing at least 45 weight %, preferably 46 to 55 weight %, aluminum hydroxide of which 99% consist of particles with a size of less than 1 $\mu$m, the balance consisting of particles with a size of less than 10 $\mu$m.

The suspension should preferably be used in a proportion of 0.1 to 3 weight %, calculated as aluminum and based on the $P_2O_5$ dissolved in the organic phosphoric acid extract. In the process of this invention, use can, for example, be made of an aluminum hydroxide suspension commercially available under the designation of MARTIFIN (this is a registered Trade Mark of Marginswerk GmbH, Bergheim, Federal Republic of Germany).

The organic extracts containing phosphoric acid should preferably be washed in several stages, a small proportion of water being introduced into the last stage countercurrently to the extract introduced into the first stage. The aluminum hydroxide suspension should preferably be introduced into one of the middle stages to provide an opportunity for the aluminum ions to transport the fluoride ions from the organic into the aqueous phase in several stages, and to provide an opportunity for the aluminum ions which go into the organic phase, to be washed out equally in several stages. It is good practice directly to introduce the aluminum hydroxide suspension into the mixing zone forming part of the washing zone comprised of mixers and settlers.

The artisan would normally expect the fluorine content to be more effectively reduced by a solution of an aluminum salt than by a suspension of a solid aluminum compound. Just the opposite is however the case as results from a comparison of Examples 2 and 3 hereinafter. In addition to this, the suspension used in accordance with this invention has been found to be extremely stable so that it is possible reliably to avoid the deposition of solid material. A further beneficial effect of the present process resides in the fact that just about 2% additional water, based on the waste water which is invariably used, is introduced leaving $P_2O_5$-concentration in the organic phase practically unaffected. In other words, the phosphoric acid obtained during the reextraction step presents the same concentration as acid washed without addition of aluminum. By the use of aluminum hydroxide it is made possible to avoid the introduction of additional ions. As a result, the $P_2O_5$-extraction yield remains unimpaired by washing liquid which comes from the washing zone through stage 1 and is customarily recycled to the extraction stage. Finally, the suspension is reasonably easy to transport, store and use in metered quantities.

The following Examples illustrate the invention, the percentages being by weight.

Various crude phosphoric acids containing about 50% $P_2O_5$ were treated in customary manner with hydrate of lime and active carbon for reducing sulfate ions and organic contaminants. Next, the prepurified acids were extracted with amyl alcohol in a countercurrent installation comprising 8 stages, concentrated sulfuric acid being additionally introduced into the 7th mixing stage, countercurrently with respect to phosphoric acid. The resulting solvent phases containing phosphoric acid—termed crude extracts hereinafter—were washed in a 10-stage mixer-settler unit with distilled water in a ratio of 30:1. Washing liquid coming from stage 1 was recycled into the 1st extraction stage. The extraction and washing operations were effected concurrently and continuously until equilibrium establishment. In those cases in which aluminum compounds were used, they were metered into the mixing zone of the 5th washing stage.

EXAMPLE 1

(Comparative Example)

Crude phosphoric acid made from Kola phosphate was extracted and gave a crude extract containing 14.16% $P_2O_5$ and 70 ppm fluorine. The purified phosphoric acid coming from the 10-stage washing zone contained 11.93% $P_2O_5$; the fluorine content was 60 ppm and there was no reduction in the fluorine content, based on $P_2O_5$. The $P_2O_5$-extraction yield was 95.75%.

EXAMPLE 2

(Comparative Example)

The conditions were as in Example 1 but a monoaluminum phosphate solution, which was used in a quantity corresponding to 0.26% Al, based on $P_2O_5$ in the crude acid, was additionally introduced into the 5th stage of the washing zone. The mono-aluminum phosphate solution was prepared by dissolving 129.0 g commercial aluminum hydroxide in 585.3 g phosphoric acid (60% $P_2O_5$) and 300.7 g water. This mixture was turbid at 40° C. and even after having been stirred for 18 hours. Only on heating to 80° C. was it possible to obtain a clear solution. Prior to metering the solution into the washing zone, it was necessary for the solution to be cooled to 40° C. The purified phosphoric acid extract solution contained 10.9% $P_2O_5$ and 29 ppm fluorine; the fluorine content had thus dropped to 53.8%. The yield was 93.7%.

EXAMPLE 3

The condition were as in Example 1 but an aluminum hydroxide suspension containing 50% solid matter, which was used in a quantity corresponding to 0.26% Al, based on $P_2O_5$ in crude acid, was introduced into the 5th washing stage. 99% of the suspended $Al(OH)_3$ consisted of particles with a size smaller than 1 μm. The resulting purified extract contained 11.84% $P_2O_5$ and 24 ppm fluorine. The fluorine content had thus dropped to 41.6%. The $P_2O_5$-yield was 95.7%.

EXAMPLE 4

(Comparative Example)

Crude phosphoric acid made from Morocco phosphate was extracted with amyl alcohol and the resulting crude extract was washed with water as in Example 1. The result obtained is indicated in the Table hereinafter.

EXAMPLE 5

(Comparative Example)

The procedure was as in Example 1 but a monoaluminum phosphate solution was added to the wash stage and the extract was washed. The result obtained is indicated in the Table hereinafter.

EXAMPLE 6

(Comparative Example)

The monoaluminum phosphate solution of Example 5 was replaced by a suspension of commercially available aluminum hydroxide in water. The aluminum hydroxide had the following particle size distribution: 45–106 μm = 55%; larger than 106 μm = 15%; smaller than 45 μm = 30%. Solid aluminum hydroxide was found to deposit in the mixer of wash stage 5 during the experiment, the depositing material clogging the inlets for aqueous phase coming from settler 6, and for organic phase coming from settler 4. The experiment was discontinued.

EXAMPLE 7

The procedure was as in Example 4 but an aluminum hydroxide suspension was metered into the mixer of washing stage 5, in accordance with this invention. The result obtained is indicated in the following Table.

| | Crude extract | | | Al quantity | Purified extract | | | Reduced to | yield |
|---|---|---|---|---|---|---|---|---|---|
| Ex. | $P_2O_5$ | F | F/$P_2O_5$ | | $P_2O_5$ | F | F/$P_2O_5$ | % | |
| 4 | 13.85 | 230 | 1660 | 0 | 11.88 | 100 | 1600 | 96.4 | 97.0 |
| 5 | 13.85 | 230 | 1660 | 0.27 | 11.02 | 90 | 816 | 49.2 | 95.0 |
| 6 | Experiment discontinued | | | | | | | | |
| 7 | 13.85 | 230 | 1660 | 0.27 | 11.86 | 89 | 750 | 45.2 | 97.0 |

EXAMPLE 8

(Comparative Example)

Crude phosphoric acid based on South-African Phalaborwa phosphate was extracted and the crude extract washed with water as described in Example 1. The purified extract contained 11.89% $P_2O_5$ and 120 ppm fluorine. The $P_2O_5$-extraction yield was 96.7%.

EXAMPLE 9

The procedure was as in Example 8 but an aluminum hydroxide suspension which was used in a quantity of 0.245% Al, based on $P_2O_5$, was additionally introduced into the 5th washing stage, in accordance with this invention. The purified extract contained 11.85% $P_2O_5$ and 55 ppm fluorine. The $P_2O_5$-yield was 96.7%.

EXAMPLE 10

The procedure was as in Example 9 but the aluminum hydroxide suspension of this invention was used in a quantity of 0.49% Al, based on $P_2O_5$. The purified extract contained 30 ppm fluorine and 11.80% $P_2O_5$. The yield was 96.5%.

We claim:

1. A process for producing phosphoric acid solutions from crude wet-processed phosphoric acid, containing fluorine ions, which process comprises extracting the said crude acid with an organic solvent; washing the organic phosphoric acid extract obtained with an aqueous aluminum hydroxide suspension containing at least 45 weight % aluminum hydroxide of which 99% consist of particles with a size of less than 1 μm, the balance consisting of particles with a size of less than 10 μm; reextracting the washed extract with water, with the resultant formation of the purified phosphoric acid having reduced fluorine content.

2. The process as claimed in claim 1, wherein a suspension containing 46–55 weight % aluminum hydroxide is used.

3. The process as claimed in claim 1, wherein the suspension is used in a proportion of 0.1 to 3 weight %, calculated as aluminum and based on $P_2O_5$ dissolved in the organic phosphoric acid extract.

4. The process as claimed in claim 1, wherein the washed extract is reextracted with an aqueous alkali metal solution, with the resultant formation of an alkali metal phosphate solution having reduced fluorine content.

5. The process as claimed in claim 4, wherein a suspension containing 46–55 weight % aluminum hydroxide is used.

6. The process as claimed in claim 4, wherein the suspension is used in a proportion of 0.1 to 3 weight %, calculated as aluminum and based on $P_2O_5$ dissolved in the organic phosphoric acid extract.

* * * * *